United States Patent [19]

Kappas

[11] 4,084,735
[45] Apr. 18, 1978

[54] SKI CASE AND RACK

[76] Inventor: Nick Kappas, 5486 Madison St., Gary, Ind. 46408

[21] Appl. No.: 267,136

[22] Filed: Jun. 28, 1972

[51] Int. Cl.² ............................................. B60R 9/12
[52] U.S. Cl. .......................... 224/42.1 E; 211/60 SK; 280/11.37 K
[58] Field of Search ...................... 224/42.1 E, 42.1 F, 224/29 R, 45 S, 5 Z, 42.03 R, 42.03 A, 42.32; 280/11.37 K, 11.37 C; 211/60 SK

[56] References Cited

U.S. PATENT DOCUMENTS

| 2,234,487 | 3/1941 | Davis | 224/45 S X |
| 3,239,115 | 8/1966 | Bott et al. | 224/42.1 F |
| 3,242,704 | 3/1966 | Barreca | 224/42.1 F UX |
| 3,366,295 | 1/1968 | Nygaard | 224/42.1 E |
| 3,601,294 | 8/1971 | Gjesdahl | 224/42.1 F |
| 3,606,111 | 1/1971 | Gjesdahl | 224/42.1 F |
| 3,677,451 | 7/1972 | Burland | 224/42.1 F |

FOREIGN PATENT DOCUMENTS 995,858  12/1951  France ............................. 224/42.1 E Primary Examiner—Trygve M. Blix
Assistant Examiner—Jerold M. Forsberg

[57] ABSTRACT

A case for storing and transporting skis and accessories which comprises a rigid enclosure on which snow skis, boots, ski poles, etc., may be placed and an attachable carrier for removably securing the enclosure to the top of an automobile. The enclosure has an opening on the top thereof extending substantially its full length. A door is hingedly secured to the enclosure to close the opening. The carrier includes at least two rigid and elongated members coupled to the enclosure so as to extend transversely thereof with means coupled to the opposite ends of the members for securing the members to a vehicle.

8 Claims, 9 Drawing Figures

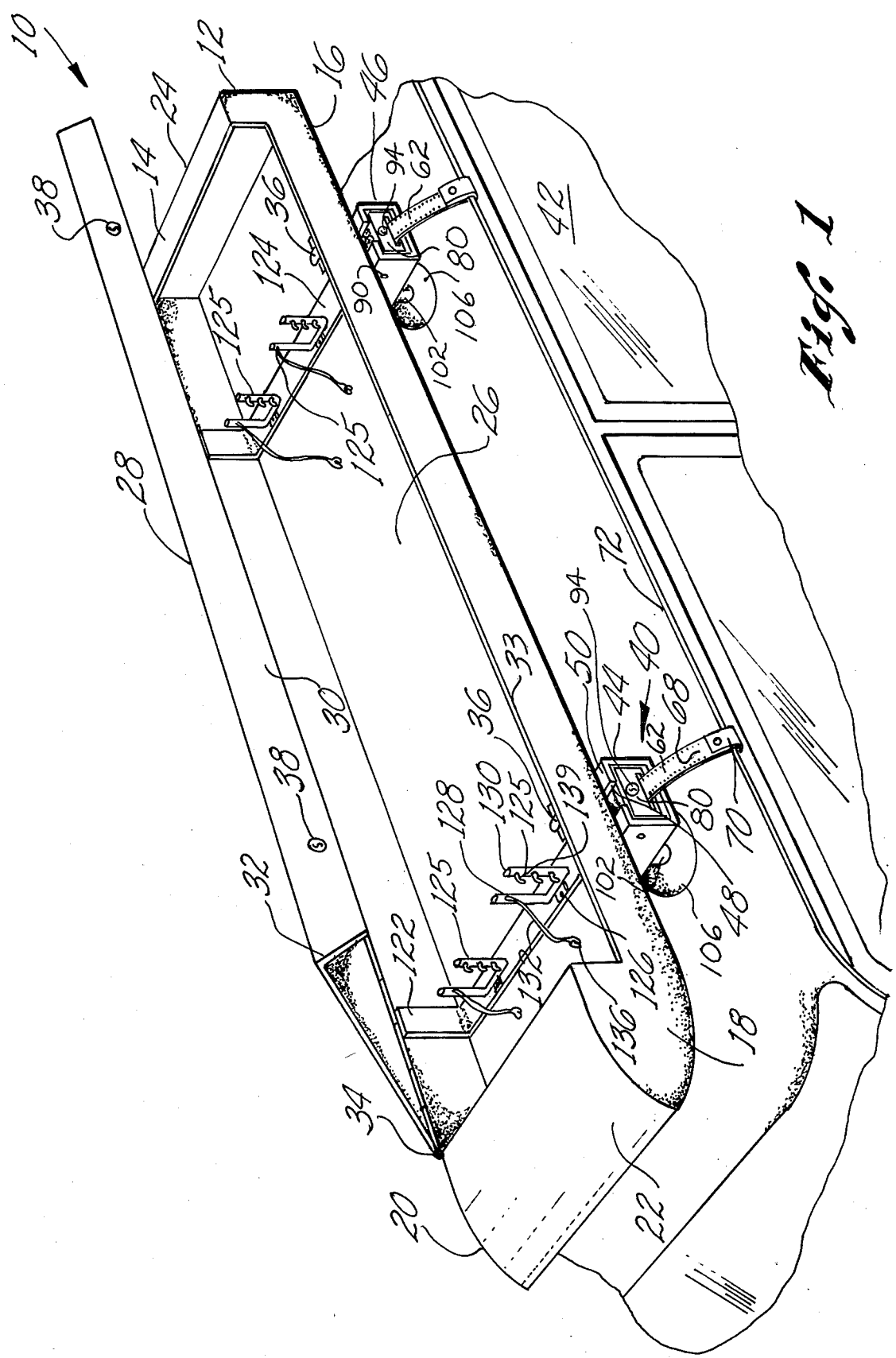

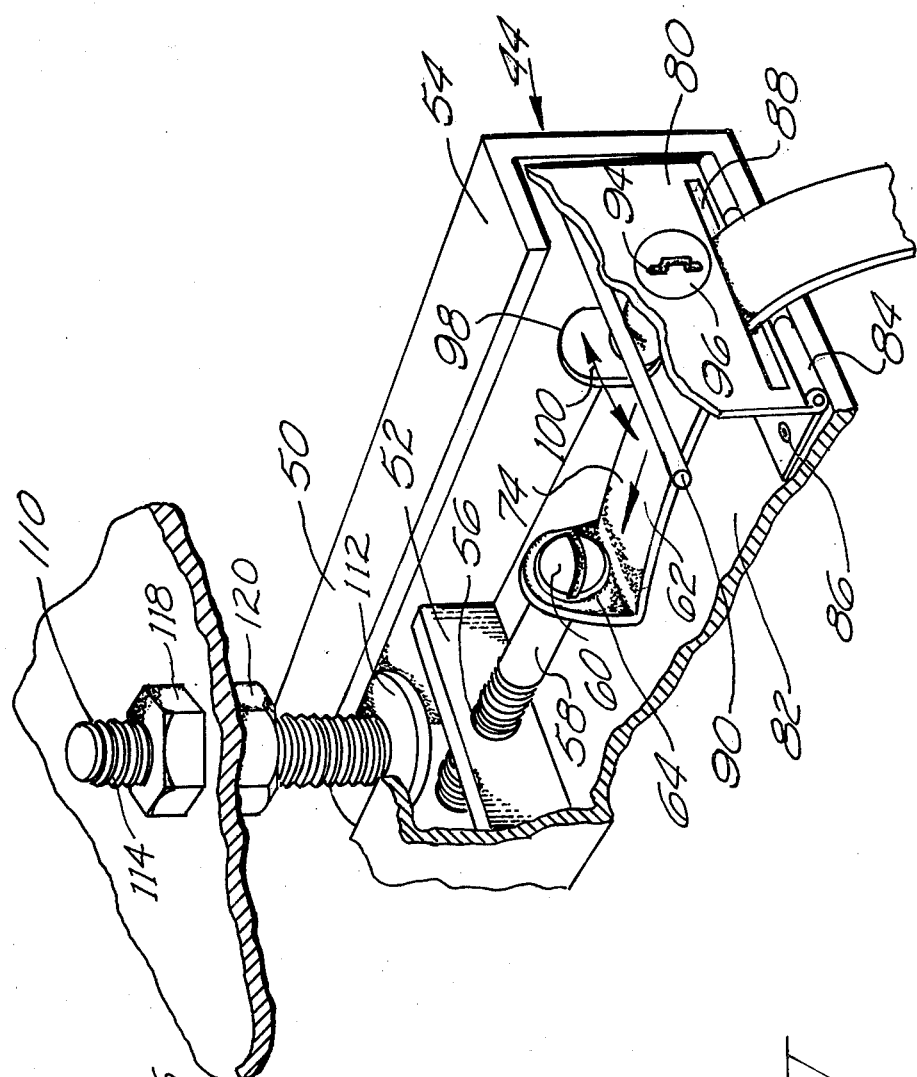
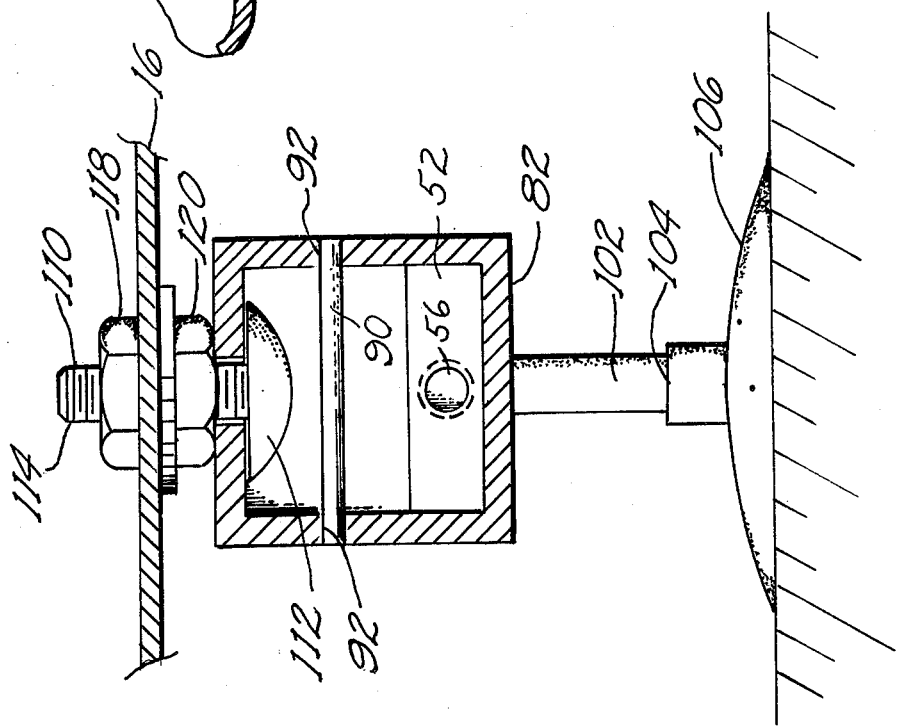

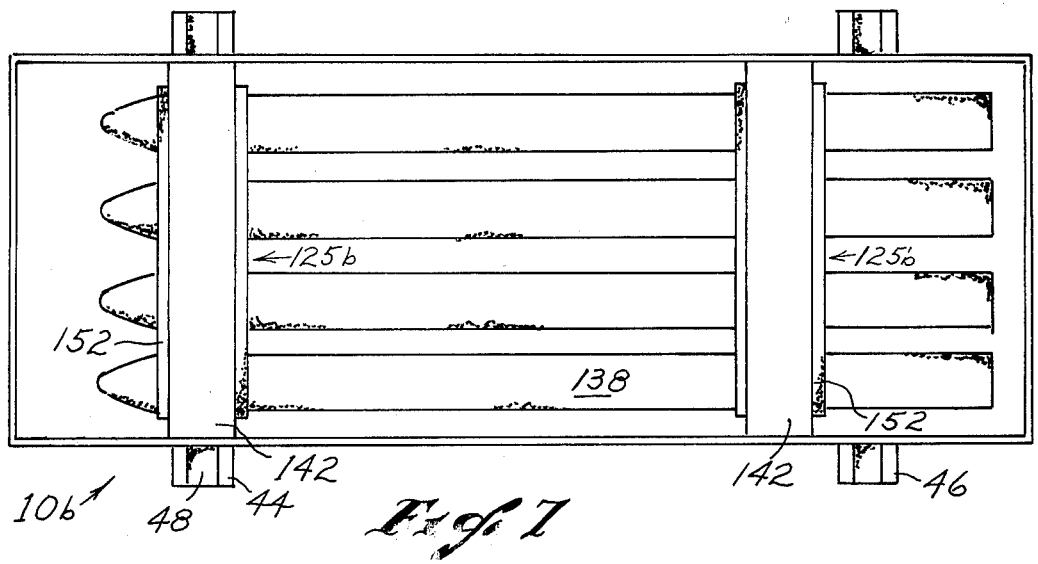
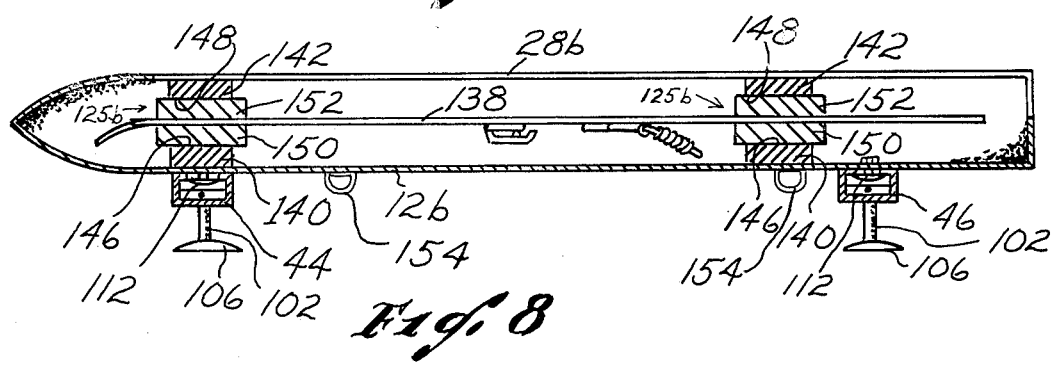
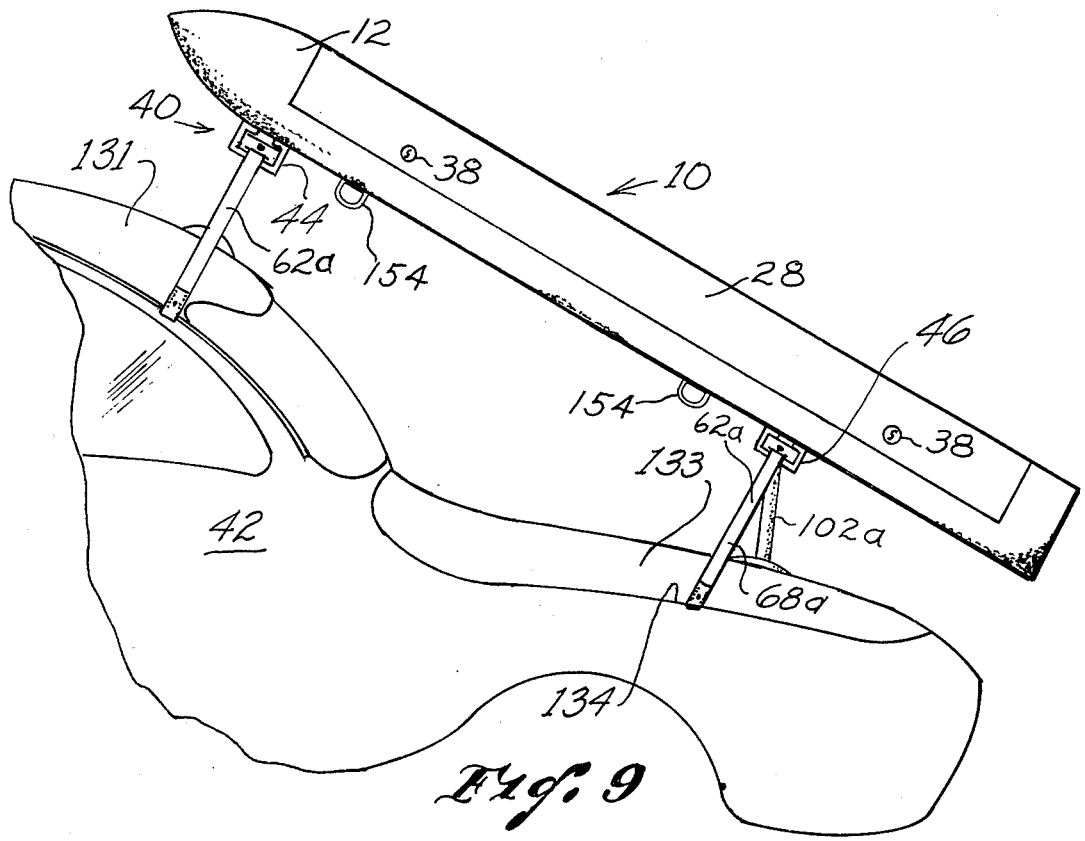

4,084,735

SKI CASE AND RACK

BACKGROUND OF THE INVENTION

1. Field of the Invention

The present invention relates to carrying devices for snow skis and accessories and in particular to a carrying case for transporting and storing skis which fully encloses the skis during transport thereof and which is removably mountable upon a vehicle.

2. Description of the Prior Art

Snow skis, by reason of their length, cannot be conveniently stored within most family type automobiles. The popularity of the sport coupled with the general requirement that the participant travel to a suitable place for skiing has led to the development of a variety of so-called "ski racks" which are variously mounted to the roof or trunk of a motor vehicle such as an automobile or the like to provide a means for transporting skis.

Inherent with participation in the sport, a substantial amount of this travel takes place over roads which must be cleared of snow and ice. Correspondingly, the roads thus traveled are frequently treated with salt or other materials for the purpose of removing the snow and ice from the roads or otherwise improving road conditions.

Prior art ski racks known to the present inventor secure the skis to the vehicle in such a way that the skis are at least partially exposed to the elements and the aforementioned snow and ice removing chemical which is thrown up by the vehicles as they travel on the roads. It is well known that a typical snow ski is fitted with expensive and carefully manufactured hardware and ski boot binders, and the skis themselves are typically made of such materials as aluminum or painted wood. As a consequence, the slush, salt spray and the like from the roads which is thrown onto the skis and the elements causes serious deterioration both to the skis and their hardware thereby ultimately rendering them unfit for use or requiring that they be fully reconditioned at substantial expense to the owner. While other enclosures for skis are known to be available, they either are in the form of flexible bags made of canvas or the like, or are only partial enclosures for skis, none is known to be designed as a part of a ski rack or capable of functioning as the invention disclosed herein.

SUMMARY OF THE INVENTION

It is therefore an object of the invention to provide an improved ski case.

It is another object of the invention to provide a ski case which fully encloses the skis being transported therein.

It is still another object of the invention to provide such a ski case wherein the enclosure is weathertight.

It is yet another object of the invention to provide a ski case which can be removably secured to a motor vehicle.

It is an object of the invention to provide such a ski case which can be securely locked to the vehicle such that it cannot be removed by unauthorized persons.

It is still another object of the invention to provide a ski case which can be used for manually transporting snow skis and storing same when removed from a vehicle.

The invention disclosed herein provides a ski case which, in addition to providing a means for securing the skis to the exterior of an automobile or the like, also provides complete protection for the skis from the weather, road salt and the like. Broadly, this ski case comprises an elongated, rigid enclosure, having a length greater than the length of a snow ski and means for removably securing the enclosure to a motor vehicle. The enclosure has an opening therethrough which extends substantially the full length of the case and a covering hingedly secured to the enclosure closing the opening. The securing means includes at least two rigid and elongated members coupled to the enclosure and which extend transversely with respect thereto. The securing means is also provided with means for coupling and locking the members to the vehicle.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective view of a ski case in accordance with the present invention shown affixed to the top of a motor vehicle;

FIG. 2 is a fragmentary, end sectional view of a portion of the securing means;

FIG. 3 is a fragmentary cutaway perspective view showing details of the securing means;

FIG. 7 is a top sectional view of the ski case showing details of the alternative ski securing means illustrated in FIG. 4;

FIG. 8 is a side sectional view of the ski case shown in FIG. 7; and

FIG. 9 is a side plan view showing an alternate method of securing the case to a vehicle.

DESCRIPTION OF A SPECIFIC EMBODIMENT

Figure 4:
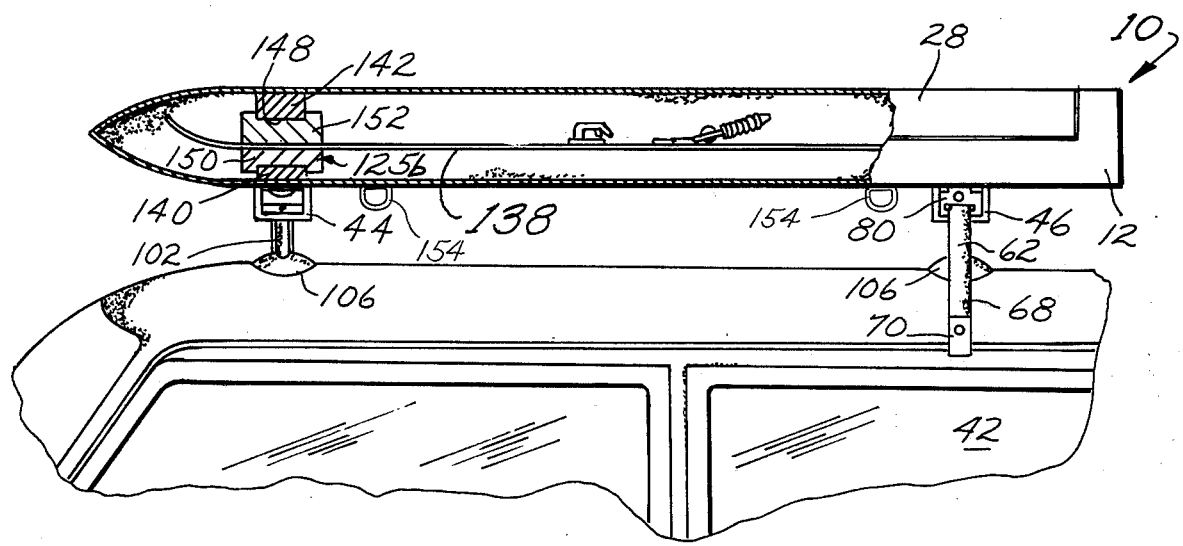
FIG. 4 is a cutaway, side plan view of the ski case shown affixed to the roof of an automobile and also showing an alternative ski securing means.

Referring now to the drawings there is shown a ski case 10 comprising an enclosure 12 having a top surface 14, bottom surface 16, and side surfaces 18, 20. Enclosure 12 is closed at its front 22 and rear 24 ends, and front end 22 is preferably aerodynamically contoured as shown. An opening 26 is provided in the upper surface 14, opening 26 extending substantially the full length of the enclosure 12.

A suitable cover 28 is shaped and proportioned to close opening 26. Preferably, the longitudinal dimension of cover 28 and the height of side panel 30 thereof are such that the peripheral edges 32 of cover 28 overlap the peripheral edges 33 of opening 26 when cover 28 is closed to thereby provide an effective weather seal.

Cover 28 is hingedly secured to enclosure 12 as shown, by a hinge 34 designed to provide a substantially weathertight hinged joint. A pair of latch pins 36 are fixedly secured to side 18 adjacent opening 26 as shown and a pair of conventional, key-operated lock mechanisms 38 are mounted in side panel 30 whereby cover 28 can be securely latched and locked when closed.

Rack 40 for removably securing the enclosure 12 to a motor vehicle 42 includes a pair of elongated, rigid members 44, 46. Members 44 and 46 are identical and therefore the structure of only one will be described in detail.

Members 44, 46 have a longitudinal dimension about equal to but less than the width of the roof and trunk of the vehicle 42. Members 44, 46 are hollow, have a generally rectangular cross-section and are provided with longitudinally extending slots 48 in their upwardly disposed walls 50.

Referring now to FIGS. 2 and 3, members 44, 46 are provided with laterally extending ribs 52 disposed ajacent ends 54 thereof. Ribs 52 are provided with a threaded hole 56 extending therethrough in a direction parallel to the longitudinal dimension of members 44, 46 and an elongated, threaded element 58 having an enlarged head 60 is threadedly received therein.

An elongated strap 62 is secured to upwardly bent rigid member 64 having therethrough a hole (not shown). Element 58 is received through this hole to thereby couple strap 62 to element 58. Strap 62 may be made of any flexible material such as thin sheet metal, woven fabric, or the like and is provided at its distal end 68 with a clip 70 (FIG. 1 only) which is adapted to hook over the gutter channel 72 of vehicle 42. It can now be seen that, with clip 70 attached to the channel 72, element 58 may be rotated to thereby draw strap 62 inwardly, as indicated by arrow 74, to tighten strap 62, and thereby secure member 44 and 46 to vehicle 42.

The ends of members 44, 46 are open and a door 80 which is dimensioned to close the open ends of members 44, 46 is hingedly secured to the bottom wall 82 by means of a hinge 84. When door 80 is in its closed position (as shown) it is flush with the terminal edges of members 44, 46. A suitable slot 88 is provided through door 80 adjacent hinge 84 and strap 62 is slidably received therethrough. Extending laterally of members 44, 46 adjacent each end thereof is a latch pin 90 which is received through suitable holes 92 in the side walls of member 44 and secured as by flaring its terminal ends.

A key operated, rotating lock mechanism 94 is mounted through door 80 adjacent the center thereof. Mechanism 94 includes a key-tumbler assembly 96 and a rotating latch element 98 which is rotated as indicated by arrow 100 by means of a suitable key (not shown). It can now be seen that when latch element 98 is in the position as shown in FIG. 3, it lockingly engages latch pin 90 to thereby secure door 80 against opening. Conversely, when element 98 is rotated leftwardly, it moves into position wherein it is no longer engaged with latch pin 90 whereby door 80 can be opened.

Fixedly secured to the bottom walls 82 are a plurality of downwardly extending legs 102. To the distal end 104 of each leg 102 is secured a conventional suction cup 106 which may be made of any suitable resilient material such as rubber or plastic, cups 106 engage the roof of vehicle 42 when members 44, 46 are secured to vehicle 42.

Fixedly secured to the bottom wall 16 of enclosure 12 are a plurality of slide elements 110. Slide elements 110 are spaced apart and arranged laterally (with respect to the longitudinal dimension of enclosure 12) in rows with the rows being longitudinally spaced apart such that each row is disposed in registry with a predetermined one of members 44 and 46. Elements 110 each include an enlarged head portion 112 which is received within members 44, 46 and a shank portion 114 which is slidably received through slots 48. Elements 110 are secured to the case 10 and the members 44, 46 by means of threaded fasteners 118, 120. It will be observed that the spacing between threaded fastener 120 and the upwardly (as viewed in FIG. 2) surface of head 112 is dimensioned such that top wall 50 is slidably received therebetween.

To secure members 44, 46 to vehicle 42, members 44, 46 are individually placed atop the vehicle 42 and pressed downwardly with sufficient force to deform suction cups 106. Clips 70 are engaged with gutter channel 72 and threaded elements 58 rotated by means of a screw driver or similar tool to tighten straps 62 thereby to positively clamp members 44, 46 to the vehicle 42. Next, slide elements 110 are aligned with slots 48 and enclosure 12 slid into position. Lastly, doors 80 are closed and lock mechanism 94 rotated to engage the latch elements 98 thereof with latch pins 90. It will be observed that latch elements 98 abutingly engage head portions 112 when in their locked positions thereby securing the enclosure 12 in proper position.

To remove the enclosure 12 from the vehicle 42, it is only necessary to unlock the doors 80 and slide the enclosure 12 laterally outwardly from members 44, 46. Preferably, enclosure 12 is provided with a suitable carrying handle 120 (FIG. 5 only) to facilitate carrying.

To increase the strength of enclosure 12, it may be provided with a plurality of reinforcing ribs as at 122, 124 (FIG. 1 only). Further, a plurality of conventional ski securing brackets 125 (FIG. 1 only) are fixedly secured to the bottom 16 of enclosure 12 by means of suitable threaded fasteners as at 126. Brackets 125 include a pair of spaced-apart and vertically upstanding legs 128, 130, the spacing between the legs 128, 130 being dimensioned to slidably receive therebetween a pair of snow skis. A resilient strap 132 is secured to the leg 128 and the distal end of strap 132 is provided with a knot or similar enlarged portion. When a pair of skis have been placed into brackets 125, straps 132 are stretched across the top of the skis and engaged with a selected one of a plurality of strap-receiving teeth 139 on leg 130, strap 132 being maintained in position by the enlarged portion 136 thereof. When ribs 122, 124 are desired for strength, both the slide elements 110 and the brackets 125 are secured to ribs 122, 124.

Figure 5:
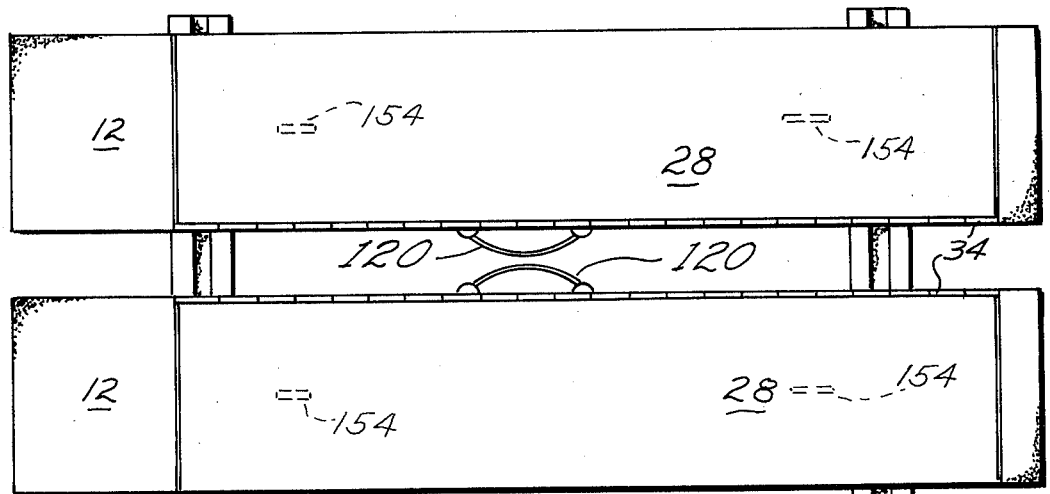
FIG. 5 is a top plan view of the ski case.

The embodiment illustrated in FIGS. 1 and 5, the enclosure 12 is laterally dimensioned to accommodate two pairs of snow skis. Thus dimensioned, two of the cases 10 can be mounted atop a single vehicle as shown in FIG. 5. When two cases 10 are mounted on members 44, 46, it is necessary to provide members 44, 46 with additional pins 90 (not shown) adjacent the center thereof the additional pins abuttingly engaging slide elements 110 to limit the insertion thereof on members 44, 46 and thereby properly position the cases 10.

Figure 6:
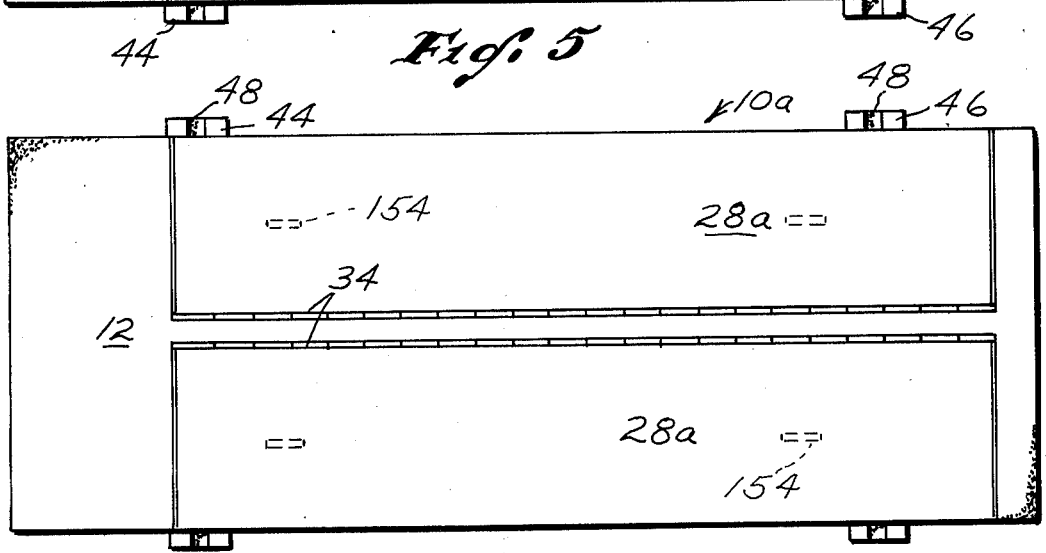
FIG. 6 is a top view of a modified form of the ski case of the invention.

A modified embodiment of the invention is shown in FIG. 6. In this embodiment, case 10a is dimensioned to accommodate four or more pairs of snow skis. The structure of the supporting members 44, 46 and case 10a is identical to that above-described with the exception that case 10a is provided with two openings 26 and two doors 28a.

Referring now to FIG. 9, an alternative manner of mounting case 10 to a vehicle 42 is shown. In this embodiment, member 44 is secured to the roof 131 of a vehicle 42 adjacent the rear thereof and member 46 is secured to the trunk lid 133 of vehicle 42. Straps 62a and member 102a are made longer and straps 62a may be secured to the vehicle 42 as by hooking same in the seam about the trunk lid 133.

In another embodiment of the case 10b, shown in FIGS. 7 and 8, the ski securing brackets 125b receive and secure the skis 138 therein in a flat position as shown. Brackets 125b each include a lower rib 140 and an upper rib 142 which are secured to and extend laterally with respect to enclosure 12b and cover 28b, respectively. Secured to the distal surfaces 146, 148 of ribs 140, 142, respectively, are elongated, resilient pads 150, 152.

When cover 28b is opened, skis 138 are placed atop the pads 150. Cover 28b is closed thereby resiliently and clampingly securing skis 138 in position between pads 150 and 152.

The ski case of the present invention is thus seen to provide a means for transporting snow skis on an automobile or the like with the case providing complete protection to the skis against exposure to and deterioration from salt spray, etc., and the weather. The case is rigid thereby protecting the skis against damage and the case itself may be simply and easily removed from or secured on a vehicle. As shown in FIGS. 4, 5, 6, 8 and 9, rings 154 are secured to the bottom of the cases 10, 10a and 10b in the center thereof adjacent to the opposite ends 22 and 24. Rings 154 are spaced apart as shown. These rings provide means by which the cases 10, 10a and 10b can be locked to a conventional ski rack such as are provided at ski resorts. A chain (not shown) is looped through rings 154, wrapped around a ski rack and the opposite ends thereof are locked together by a conventional padlock. When mounted to the vehicle or chained to a ski rack, the case can be securely locked whereby it cannot be removed by unauthorized persons or its contents stolen, and when removed from the vehicle and not chained to a ski rack, the case can be transported manually. The case further provides a convenient storage place for accessory equipment such as boots, ski poles, and the like. The securing means for the ski case are versatile and easily adapted for mounting the case at various points and in different positions atop a vehicle and the case itself, by reason of its contour, causes a minimum of wind drag to the vehicle.

While there have been described above the principles of this invention in connection with specific apparatus, it is to be clearly understood that this description is made only by way of example and not as a limitation to the scope of the invention.

What is claimed is:

1. A luggage carrier and rack especially useful for carrying skis comprising a rigid enclosure including top, bottom and side surfaces and having an opening therethrough thereby providing access to the interior of said enclosure, a cover hingedly secured to said enclosure and closing said opening, a plurality of rigid and elongated members, both of said members having a hollow interior and an upwardly facing surface with a slot therein extending between said interior and member surface, said slot also being elongated and extending the entire length of said members, said members also having open ends, a plurality of slide elements having an enlarged head portion and a narrower neck portion fixedly secured to said enclosure bottom in spaced-apart rows, said enlarged portions of each row of said elements being positioned in the interior of a different one of said members, said neck portions being positioned in said slots, a plurality of doors each hingedly secured to respective ends of said members closing said ends, means for locking said doors in a closed position and engaging the head portion of said slide elements hereby preventing the removal of said enclosure from said members without unlocking said doors, means at the opposite ends of said members for securing said members to an upwardly facing surface of a vehicle, said member securing means including a plurality of flexible straps, means for coupling said straps to the respective ends of said members, said coupling means further including means for adjusting the extension of said straps with respect to said members, a hook element secured to the distal end of each said strap and adapted to engage a portion of said vehicle, said extension adjusting means including a first female threaded member fixedly secured adjacent the distal end of each of said members and a male threaded member threadingly engaged therewith coupled to the proximal end of each of said straps, said locking means including a latch pin secured adjacent the end of each of said members and a latch mechanism mounted on each of said doors and including a latch plate movable between a first position lockingly engaged with said latch pin and a second position disengaged therefrom, said latch plate abuttingly engaging a respective one of said slide members when in said lockingly engaged position, said male and female elements being disposed within the interior of said hollow members whereby said elements are inaccessible when said doors are locked.

2. A ski case comprising an elongated, rigid enclosure having a length greater than the length of a snow ski, said enclosure including top, bottom, and side surfaces and having an opening therethrough extending substantially the full length thereof, a cover hingedly secured to said enclosure and closing said opening, means for removably securing said enclosure to an upwardly facing surface of a vehicle, said securing means including at least two rigid and elongated members coupled to said enclosure and extending transversely with respect thereto, means at the opposite ends of said members for securing said members to said vehicle, said member securing means including a plurality of flexible straps, means for coupling said straps to the respective ends of said members, said coupling means further including means for adjusting the extension of said straps with respect to said members, a hook element secured to the distal end of each said strap and adapted to engage a portion of said vehicle, said extension adjusting means including a first female threaded member fixedly secured adjacent the distal end of each of said members and a male threaded member threadingly engaged therewith coupled to the proximal end of each of said straps said members being hollow, said coupling means including a slot in each of said members extending the length thereof, a plurality of slide elements having enlarged head portions and a narrower neck portion fixedly secured to said bottom in laterally parallel rows, said enlarged head being received within said hollow members and said narrower neck portions being received within said slots, means for locking said slide elements against relative movement with respect to said members, said locking means including a plurality of doors individually, hingedly secured to respective ends of said members and movable between a first position in which the ends of said members are open and a second position in which said doors close the ends of said members, a latch pin secured adjacent the end of each of said members and a latch mechanism mounted on said doors and including a latch plate movable between a first position lockingly engaged with said latch pin and a second position disengaged therefrom, said latch plate abuttingly engaging a respective one of said slide members when in said lockingly engaged position, said male and female elements are disposed within the interior of said hollow members whereby said elements are inaccessible when said doors are in said first position.

3. A ski case comprising an elongated, rigid enclosure having a length greater than the length of a snow ski, said enclosure including top, bottom, and side surfaces and having an opening therethrough extending substantially the full length thereof, a cover hingedly secured to said enclosure and closing said opening, means for removably securing said enclosure to an upwardly facing surface of a vehicle, said securing means including at least two rigid and elongated members coupled to said enclosure and extending transversely with respect thereto, means at the opposite ends of said members for securing said members to said vehicle, said member securing means including a plurality of flexible straps, means for coupling said straps to the respective ends of said members, said coupling means further including means for adjusting the extension of said straps with respect to said members, a hook element secured to the distal end of each said strap and adapted to engage a portion of said vehicle, said extension adjusting means including a first female threaded member fixedly secured adjacent the distal end of each of said members and a male threaded member threadingly engaged therewith coupled to the proximal end of each of said straps, said members being hollow, said coupling means including a slot in each of said members extending the length thereof, a plurality of slide elements having enlarged head portions and a narrower neck portion fixedly secured to said bottom in laterally parallel rows, said enlarged head being received within said hollow members and said narrower neck portions being received within said slots, means for locking said slide elements against relative movement with respect to said members, said locking means including a plurality of doors individually, hingedly secured to respective ends of said members and movable between a first position in which the ends of said members are open and a second position in which said doors close the ends of said members, a latch pin secured adjacent the end of each of said members and a latch mechanism mounted on said doors and including a latch plate movable between a first position lockingly engaged with said latch pin and a second position disengaged therefrom, said latch plate abuttingly engaging a respective one of said slide members when in said lockingly engaged position, said male and female elements are disposed within the interior of said hollow members whereby said elements are inaccessible when said doors are in said first position, means for locking said cover in a closed position and a plurality of braces secured to the interior of said enclosure, and means mounted within said enclosure for securing skis therein.

4. A ski case comprising an elongated, rigid enclosure having a length greater than the length of a snow ski, said enclosure including top, bottom, and side surfaces and having an opening therethrough extending substantially the full length thereof, a cover hingedly secured to said enclosure and closing said opening, means for removably securing said enclosure to an upwardly facing surface of a vehicle, said securing means including at least two rigid and elongated members coupled to said enclosure and extending transversely with respect thereto, means at the opposite ends of said members for securing said members to said vehicle, means for removably coupling said case to said members, said members being hollow, said coupling means including a slot in each of said members extending the length thereof, a plurality of slide elements having enlarged head portions and a narrower neck portion fixedly secured to said bottom in laterally parallel rows, said enlarged head being received within said hollow members and said narrower neck portions being received within said slots, means for locking said slide elements against relative movement with respect to said members, said locking means including a plurality of doors individually, hingedly secured to respective ends of said members and movable between a first position in which the ends of said members are open and a second position in which said doors close the ends of said members, a latch pin secured adjacent the end of each of said members and a latch mechanism mounted on said door and including a latch plate movable between a first position lockingly engaged with said latch pin and a second position disengaged therefrom, said latch plate abuttingly engaging a respective one of said slide members when in said lockingly engaged position.

5. A ski case comprising an elongated, rigid enclosure having a length greater than the length of a snow ski, said enclosure including top, bottom, and side surfaces and having an opening therethrough extending substantially the full length thereof, a cover hingedly secured to said enclosure and closing said opening, means for removably securing said enclosure to an upwardly facing surface of a vehicle, said securing means including at least two rigid and elongated members coupled to said enclosure and extending transversely with respect thereto, means at the opposite ends of said members for securing said members to said vehicle, means for removably coupling said case to said members, said members are hollow, said coupling means including a slot in each of said members extending the length thereof, a plurality of slide elements having enlarged head portions and a narrower neck portion fixedly secured to said bottom in laterally parallel rows, said enlarged head being received within said hollow members and said narrower neck portions being received within said slots, means for locking said slide elements against relative movement with respect to said members, said locking means including a plurality of doors individually, hindgedly secured to respective ends of said members and movable between a first position in which the ends of said members are open and a second position in which said doors close the ends of said members, a latch pin secured adjacent the end of each of said members and a latch mechanism mounted on said door and including a latch plate movable between a first position lockingly engaged with said latch pin and a second position disengaged therefrom, said latch plate abuttingly engaging a respective one of said slide members when in said lockingly engaged position, said latch mechanism including a key operated tumbler assembly.

6. A luggage carrier and rack especially useful for carrying skis comprising a rigid enclosure including top, bottom and side surfaces and having an opening therethrough thereby providing access to the interior of said enclosure, a cover hingedly secured to said enclosure and closing said opening, a plurality of rigid and elongated members, both of said members having a hollow interior and an upwardly facing surface with a slot therein extending between said interior and member surface, said slot also being elongated and extending the entire length of said members, said members also having open ends, a plurality of slide elements having an enlarged head portion and a narrower neck portion fixedly secured to said enclosure bottom in spaced-apart rows, said enlarged portions of each row of said elements being positioned in the interior of a different one of said members, said neck portions being positioned in said slots, a plurality of doors each hingedly secured to respective ends of said members closing said ends, means for locking said doors in a closed position and engaging the head portion of said slide elements thereby preventint the removal of said enclosure from said members without unlocking said doors, means at the opposite ends of said members for securing said members to an upwardly facing surface of a vehicle, said member securing means including a plurality of flexible straps, means for coupling said straps to the respective ends of said members, said coupling means further including means for adjusting the extension of said straps with respect to said members, a hook element secured to the distal end of each said strap and adapted to engage a portion of said vehicle, said extension adjusting means including a first female threaded member fixedly secured adjacent the distal end of each of said members and a male threaded member threadingly engaged therewith coupled to the proximal end of each of said straps, said locking means including a latch pin secured adjacent the end of each of said members and a latch mechanism mounted on each of said doors and including a latch plate movable between a first position lockingly engaged with said latch pin and a second position disengaged therefrom, said latch plate abuttingly engaging a respective one of said slide members when in said lockingly engaged position.

7. A luggage carrier and rack especially useful for carrying skis comprising a rigid enclosure including top, bottom, and side surfaces and having an opening therethrough thereby providing access to the interior of said enclosure, a cover hingedly secured to said enclosure and closing said opening, a plurality of rigid and elongated members, both of said members having a hollow interior and an upwardly facing surface with a slot therein extending between said interior and member surface, said slot also being elongated and extending the entire length of said members, said members also having open ends, a plurality of slide elements having an enlarged head portion and a narrower neck portion fixedly secured to said enclosure bottom in spaced-apart rows, said enlarged portions of each row of said elements being positioned in the interior of a different one of said members, said neck portions being positioned in said slots, a plurality of doors each hingedly secured to respective ends of said members closing said ends, means for locking said doors in a closed position and engaging the head portion of said slide elements thereby preventing the removal of said enclosure from said members without unlocking said doors, means at the opposite ends of said members for securing said members to an upwardly facing surface of a vehicle, said member securing means including a plurality of flexible straps, means for coupling said straps to the respective ends of said members, said coupling means further including means for adjusting the extension of said straps with respect to said members, a hook element secured to the distal end of each said strap and adapted to engage a portion of said vehicle, said extension adjusting means including a first female threaded member fixedly secured adjacent the distal end of each of said members and a male threaded member threadingly engaged therewith coupled to the proximal end of each of said straps, said locking means including a latch pin secured adjacent the end of each of said members and a latch mechanism mounted on each of said doors and including a latch plate movable between a first position lockingly engaged with said latch pin and a second position disengaged therefrom, said latch plate abuttingly engaging a respective one of said slide members when in said lockingly engaged position, said male and female elements being disposed within the interior of said hollow members whereby said elements are inaccessible when said doors are locked, means for locking said cover in a closed position and a plurality of braces secured to the interior of said enclosure, and means mounted within said enclosure for securing skis therein.

8. A luggage carrier and rack especially useful for carrying skis comprising an elongated, rigid enclosure having a length greater than the length of a snow ski, said enclosure including top, bottom, and side surfaces and having an opening therethrough extending substantially the full length thereof, a cover hindgedly secured to said enclosure and closing said opening, means for removably securing said enclosure to an upwardly facing surface of a vehicle, said securing means including at least two rigid and elongated members coupled to said enclosure and extending transversely with respect thereto, and means at the opposite ends of said members for securing said members to said vehicle, means for removably coupling said case to said members, said members are hollow, said coupling means including a slot in each of said members extending the length thereof, a plurality of slide elements having enlarged head portions and a narrower neck portion fixedly secured to said bottom in laterally parallel rows, said enlarged head being received within said hollow members and said narrower neck portions being received within said slots, and means for locking said slide elements against relative movement with respect to said members, said locking means includes a plurality of doors individually, hindgedly secured to respective ends of said members and movable between a first position in which the ends of said members are open and a second position in which said doors close the ends of said members, a latch pin secured adjacent the end of each of said members and a latch mechanism mounted on said door and including a latch plate movable between a first position lockingly engaged with said latch pin and a second position disengaged therefrom, said latch plate abuttingly engaging a respective one of said slide members when in said lockingly engaged position.

* * * * *